Oct. 30, 1962 C. B. ENSINGER 3,061,327
DOLLY FOR STOVES AND THE LIKE
Filed Feb. 17, 1958
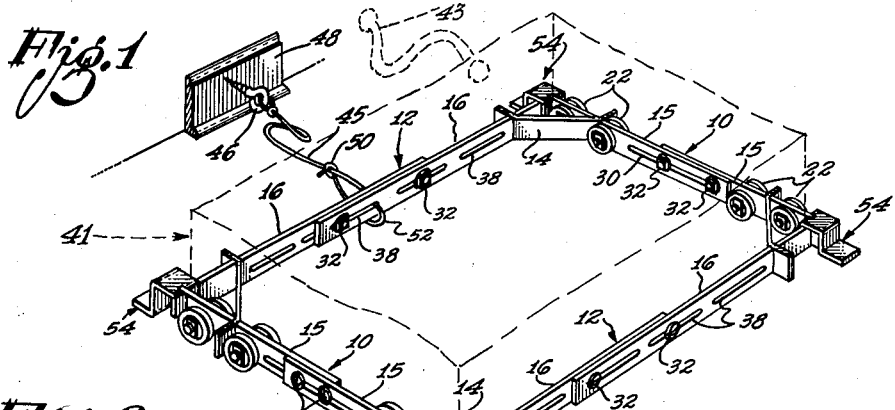
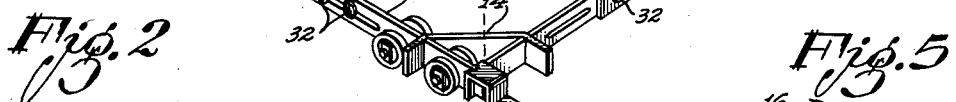
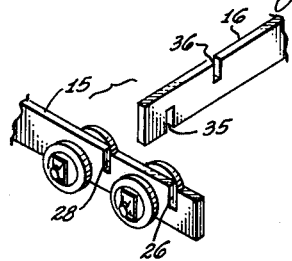
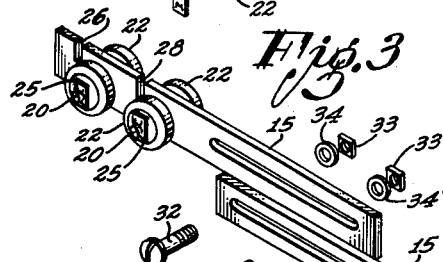
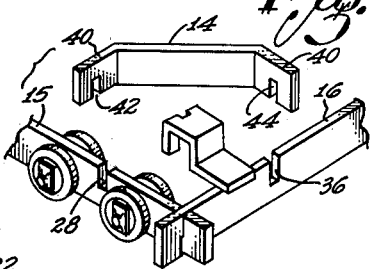
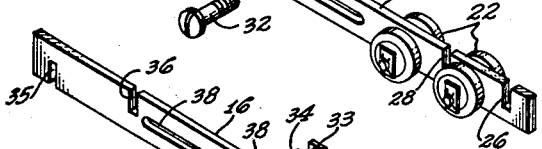
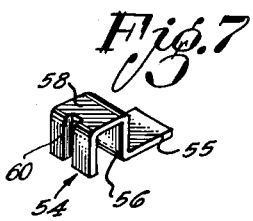
INVENTOR:
Chester B. Ensinger
Attorney

United States Patent Office 3,061,327
Patented Oct. 30, 1962

3,061,327
DOLLY FOR STOVES AND THE LIKE
Chester B. Ensinger, 4999 Sunset Lane, Ogden, Utah
Filed Feb. 17, 1958, Ser. No. 715,634
10 Claims. (Cl. 280—35)

This invention relates to dollies for heavy household appliances such as kitchen stoves, refrigerators, etc., and, more particularly, is directed to the construction of a dolly that is intended to be installed under such a household appliance for long periods of time.

It is exceedingly difficult to clean under and behind a stove or refrigerator and such appliances are so heavy and awkward to handle that it is difficult to move them for the purpose of facilitating cleaning operations. The present invention meets this problem by providing an inexpensive dolly of ample strength that is adjustable to fit a wide range of sizes and may be permanently mounted under an appliance. Thus, while the dolly may be sold to accompany the new appliances, an important feature is that the dolly may also be sold to householders for installation under existing stoves and refrigerators.

The problem of providing an inexpensive dolly is met, in part, by using standard steel bar stock for a construction that may be produced on a mass basis by punch press operations; and in further part by simply notching or slotting the component bars for interlocking engagement. No welds, rivets, screws, or other fastening expedients are required and no special tools and no special skill are needed. Economy is further achieved by providing a dolly that may be sold in knocked-down state for assembly by the purchaser. The knocked-down construction eliminates assembly cost and, moreover, the dismantled dolly may be compactly packaged to reduce handling, storing and shipping costs.

A further factor in economy is that only one size dolly is necessary for all stoves and appliances, since the dolly is adjustable both in width and length. In addition, brackets or load clips to take the weight of the appliance at the four corners of the dolly are adjustable in that each bracket may be turned to extend either lengthwise or laterally of the dolly.

With reference to the problem of achieving strength and rigidity, the use of flat steel bars that are relatively thin and relatively wide is important. The bars are oriented in vertical planes to receive loads edgewise across the maximum dimension of the bars. Thin bars oriented edgewise of the load and adequately braced against flexure and torsion result in an exceptionally high strength/weight ratio. In this regard a feature of the invention is that inter-connecting the flat bars at the corners of the dolly frame by interlocking slots inherently braces the individual bars near their ends and the addition of interlocking diagonal braces of the same bar stock provides similar reinforcement at two additional points along the length of each of the four sides of the rectangular frame.

A further feature of the invention with regard to strength and rigidity is that the dolly responds to imposed weight by a self-tightening action. In fact if the mating pairs of slots of the sides and diagonal braces of the dolly frames are only loosely engaged in the assembly procedure, the initial imposition of the weight of an appliance will force each engaged pair of slots to maximum tightness. In addition, as will be explained, the imposed load of the appliance also tightens the load bearing clips at the four corners of the dolly frame. A further feature of the construction is that the rectangular dolly frame is adjustable into snug fit inside the rectangular base skirt of an appliance to derive further rigidity from the appliance itself.

The invention is further characterized by the use of pairs of close coupled wheels stradding the thin steel bars of the dolly frame in a stable manner. In the preferred practice of the invention, sixteen standard stock wheels two inches in diameter are used, each wheel having a solid hard rubber tire ⅞ inch wide. Such a wheel arrangement provides exceptional stability under movement and further provides sufficient distribution of the load to avoid marring a floor surface, even when the appliance weighs as much as 650 pounds.

It has been found that the slight yielding or flattening of the sixteen rubber tires at their areas of contact with the floor and the corresponding slight yielding of the usual floor material provide a desirable degree of resistance to initial movement of the appliance out of its normal position. A force on the order of 38 pounds is usually required to start travel of the loaded dolly out of its normal position and this fact prevents movement of the dolly by small children. On the other hand, a housewife can easily move the appliance, a force of only 20 pounds being enough to keep the loaded dolly in motion.

An unexpected advantage of the dolly of the invention is that it eliminates the necessity of re-shimming an appliance every time the appliance is moved for a cleaning operation. Shims are commonly used at one or more corners of an appliance to level the appliance. The corner load clips of the dolly are designed to receive such shims and the shims are not disturbed when the dolly is moved to shift the appliance temporarily out of its normal position.

In many instances, gas stoves are supplied with fuel by flexible gas hoses to permit the stoves to be moved from their normal positions for cleaning purposes. There is always a possibility, however, that such a stove will be inadvertently moved too far with the result that the flexible hose is damaged or broken. Such damage is especially likely to occur when it is necessary to wrestle with a heavy stove in a forcible manner in the absence of a dolly. The preferred practice of the invention eliminates this hazard by providing what may be termed a stop cable, one end of the cable being attached to the dolly and the other end being anchored to the wall of the kitchen.

The various features, objects and advantages of the invention may be understood from the following detailed description considered with the accompanying drawing.

In the drawing, which is to be regarded as merely illustrative:

FIG. 1 is a perspective view of a fully assembled dolly embodying the presently preferred practice of the invention;

FIG. 2 is an exploded perspective view of one of the bars of the dolly together with components of the associated wheel assemblies;

FIG. 3 is a perspective view illustrating the manner in which two of the bars of FIG. 1 equipped with their wheel assemblies may be adjustably interconnected by bolts and nuts;

FIG. 4 is a perspective view showing how two bars across the front or back of the dolly frame may be adjustably interconnected by bolts and nuts;

FIG. 5 is a fragmentary perspective view showing two bars of the dolly frame positioned for mutual interlocking engagement to form a corner of the frame;

FIG. 6 is a similar fragmentary perspective view showing how in the assembly procedure a diagonal brace and a load clip may be positioned for installation at each corner of the dolly; and FIG. 7 is a perspective view of a load clip.

The dolly of the presently preferred practice of the invention shown in FIG. 1 has a rectangular frame of four side members comprising two parallel side members, each generally designated 10, and two parallel front and back side members, each generally designated 12. The four corners of the rectangular frame are braced by diagonal members 14. All of these members may be made of the same bar stock, preferably ⅛ by 1½ inch steel bars.

To make the dolly adjustable in width and length, each of the two side members 10 may comprise two adjustably overlapped steel bars and, in like manner, each of the front and back side members 12 may comprise a pair of adjustably overlapped bars. In this regard a feature of the invention is that four identical steel bars 15 make up the two parallel side members 10 of the frame and four identical steel bars 16 make up to two front and back side members 12. Thus each of the two parallel side members 10 comprises a pair of identical overlapping bars 15 and each of the two parallel side members 12 comprises a pair of overlapping bars 16.

As best shown in FIG. 2, each of the two bars 15 that make up a side member 10 of the rectangular dolly frame comprises a flat piece of bar stock with two spaced circumferential apertures 18 to receive corresponding axles 20 and corresponding pairs of wheels 22. The axles 20 are plain steel pins and each of the wheels 22 incorporates a self-lubricating bearing (not shown) to journal the steel pins. Each of the wheels 22 is further provided with a solid flat rubber tire 24. The wheels are secured in their assembled positions by any suitable fastening means, for example by spring steel fastening elements 25 of a well known type which merely need to be forced to their assembled positions on the axle pins 20.

Each of the bars 15 is also provided with an upwardly opening slot 26 near its outer end for interlocking engagement with a corresponding bar 16 and is further provided with a second upwardly opening slot 28 for interlocking engagement with a corresponding diagonal brace 14. The second slot 28 is positioned between the pair of axle-receiving apertures 18.

Each of the steel bars 15 is further provided with a longitudinal slot 30 by means of which two of the steel bars may be adjustably interconnected to form a side member 10 of the dolly frame. As shown in FIGS. 1 and 3, the two steel bars 15 that make a side member 10 are positioned with their longitudinal slots 30 overlapping and a pair of stove bolts 32 are inserted through the overlapping slots. Nuts 33 are tightened against washers 34 on the stove bolts 32 to fixedly interconnect the two bars 15 at a desired overall length for the side member 10.

As shown in FIGS. 1 and 4, each of the bars 16 that make up a side member 12 of the dolly frame is provided with a downwardly opening slot 35 near its outer end for interlocking engagement with the corresponding slot 26 of a corresponding bar 15 and each of the bars 16 is further provided with a second upwardly opening slot 36 for interlocking engagement with a corresponding diagonal brace 14. To permit two of the bars 16 to be adjustably interconnected to form a side member 12 of the dolly frame, each of the bars may be formed with three aligned longitudinal slots 38. With the slots 38 of the two bars 16 overlapping, stove bolts 32 are extended through the slots and nuts 33 are tightened against washers 34 onto the stove bolts to interconnect the two bars at a desired over-all length.

As shown in FIG. 6, each of the diagonal braces 14 may comprise a short length of the steel bar stock with two end portions 40 bent at an angle of 45 degrees. One of the end portions 40 of a diagonal brace 14 is provided with a downwardly opening slot 42 for interlocking engagement with a corresponding upwardly opening slot 28 of a steel bar 15 and the other end portion is provided with a similar downwardly opening slot 44 for interlocking engagement with a corresponding upwardly opening slot 36 of a steel bar 16.

The first step in the procedure of assembling the dolly frame may be to assemble the axles 20 and the wheels 22 to the four bars 15 in the manner indicated by FIG. 2. The second step may be to interconnect the four bars 15 in pairs in the manner indicated by FIG. 3, making sure that all of the slots 26 and 28 are turned upward. The third step may be to assemble the four bars 16 in pairs as indicated by FIG. 4, making sure that all of the end slots 35 are turned downward.

The next step in the assembly procedure may be to interlock the downwardly open slots 35 of the bars 16 with the upwardly opening slots 26 of the bars 15 in the manner indicated by FIGS. 5 and 6 to form the four corners at which the bars 15 and 16 intersect. The next step may be to position the four diagonal braces 14 in the manner shown in FIG. 6 for interlocking the slots 42 of the braces with the slots 36 of the bars 16 and for interlocking the slots 44 of the braces with slots 28 of the bars 15, to complete the bracing of the corners as shown in FIG. 1.

In those instances in which the dolly is to be used under a gas stove that is supplied with fuel by a flexible hose, the next step may be to anchor one end of a stop cable to the dolly and to anchor the other end of the stop cable to the wall adjacent the desired location of the stove. FIG. 1 for example shows in phantom a gas stove 41 connected to a domestic gas line by a flexible hose 43. FIG. 1 shows a stop cable 45 that may be used for this purpose.

The stop cable 45 may be a flexible steel woven cable of ⅛ inch diameter that is suitably attached at one end to an eye screw 46 for attachment to a baseboard 48. In this embodiment of the invention, the other end of the cable 45 is provided with a ferrule 50 of a soft pliable metal such as copper that may be pinched by a pair of pliers into positive engagement with an intermediate point of the cable to form a loop 52 in engagement with the dolly frame. As shown in FIG. 1, the loop 52 may pass through slots 38 of an overlapping pair of the bars 16. The length of the cable 45 is selected to limit the movement of the dolly to a range that is safe for the flexible gas hose and the effective length of the cable may be varied by varying the point at which the ferrule 50 is crimped into engagement with the cable.

The final step in the assembly procedure may be to install a load clip 54 at each corner of the dolly frame to receive the weight of the appliance. The load clips are generally designated 54 in the drawing. As best shown in FIG. 7, each of the load clips 54 may be a bent piece of relatively heavy metal bar stock. Each load clip 54 has a horizontal end portion 55 to receive the load of the appliance, an adjacent vertical portion 56 to back against the vertical outer end of a bar 15 or a bar 16, an upper horizontal portion 58 to rest on the intersecting bars 15 and 16 and a downwardly extending inner end flange 60 that is slotted or forked to straddle one of the intersecting bars 15 and 16 in abutment against the inner side face of the other intersecting bar.

The end slots 26 of the bars 15 and the end slots 35 of the bars 16 are all at the same distance from the outer ends of the bars with the result that the end portions of the bars that extend beyond the intersections of the bars at the four corners of the rectangular frame are all equal. It is apparent, therefore, that each of the load clips 54 at each of the four corners of the rectangular dolly frame may be positioned either to extend laterally of the frame as shown in FIG. 1 or to extend in an alternate position longitudinally of the frame. It is further apparent that each of the load clips 54 will be tightened in its assembled position by the imposition of the weight of the appliance. In fact, the whole dolly frame is tightened by the imposed weight.

The over-all length and width of the assembled dolly are adjusted to cause the vertical portions 56 of the four load clips 54 to fit snugly into the rectangular bottom skirt of the appliance so that the dolly frame derives rigidity from the appliance. The weight also tightens the dolly frame itself. Thus weight imposed on the bars 16 tightens their engagement with the bars 15, and weight imposed on the braces 14 tightens their engagement with both the bars 15 and the bars 16.

With respect to adjustability in length and width, the dolly may be considered as comprising four adjustably interconnected corner assemblies. Each of the four corner assemblies comprises a pair of intersecting steel bars 15 and 16, two pairs of wheels 22 on the steel bar 15, a diagonal brace 14 intersecting and interlocking the two bars 15 and 16 are a load clip 54.

It may be readily appreciated that the components of the rectangular frame may be economically produced by simple punch press operations and especially so because all of the steel bars 15 are identical and all of the steel bars 16 are identical. The whole assembly may be compactly packed in knocked-down state and its requires no special skill and only simple tools to assemble the dolly at exactly the dimensions required for any particular appliance. It is a simple matter to add the stop cable 45 when the appliance is a gas stove that is supplied by a flexible hose. A special advantage of using a stop cable 45 is that the stop cable prevents damage to the flexible hose in the event of an earthquake.

Preferably the apertures 18 that receive the axles 20 are slightly larger in diameter than the axles, say larger by 1/32 inch. Such an arrangement permits each axle to tip slightly to lower one of its wheels and lift the other wheel in an equalizing manner to follow irregularities in the floor surface with both wheels under load.

It is to be noted that the vertical dimension of the space occupied by the dolly is small so that the dolly elevates its load but a small distance above the floor. This fact is important because any substantial gap under a stove or refrigerator is unsightly and also because the dolly itself should not be conspicuous or even noticeable. An important feature of the invention is that high structural strength is achieved in this small vertical dimension. Thus the major portion of the vertical dimension is utilized by the thin bars turned to lie in vertical planes. A related feature is the use of relatively large wheels in the small vertical dimension to make it possible to move a heavily loaded dolly with relatively small manual exertion. Compactness in vertical dimension is achieved by arranging for the major portion of the vertical dimension of the wheels to overlap the major portion of the vertical dimension of the thin bars. Thus, as may be seen in the drawing, the top edges of the thin bars that form the dolly frame are only slightly above the top sides of the wheels and the lower edges of the bars are only slightly above the bottoms of the wheels.

My description in specific detail of the presently preferred embodiment of the invention will suggest various changes, substitutions and other departures from my disclosure within the spirit and scope of the appended claims.

I claim:

1. A dolly for use under a household appliance such as a stove or refrigerator, comprising: a horizontal rectangular frame made of relatively thin and wide metal bars positioned in vertical planes; and support wheels on the metal bars on two parallel sides of the frame on axes fixed relative to the frame, said wheels being mounted parallel to the bars arranged in pairs with each pair straddling one of the bars in close proximity thereto, there being at least one pair of wheels near each of the four corners of the frame, the major portion of the vertical dimension of the wheels being coextensive with the major portion of the vertical dimension of the bars.

2. A dolly as set forth in claim 1 in which said metal bars are flat metal bars mechanically interlocked to form joints at the four corners of the frame, the metal bars on said two parallel sides having upwardly open vertical slots in their upper edges, the metal bars on the other two sides having correspondingly downwardly open vertical slots in their lower edges, the slotted portions of the bars intersecting in mutual engagement at the four corners of the frame whereby loads imposed on said other two sides of the frame are transferred at the slots to said two parallel sides and are transferred thereby to said wheels.

3. A dolly as set forth in claim 2 which includes load clips at the four corners of the frame to receive the weight of the household appliance, each of said load clips comprising a bent flat metal bar having a substantially horizontal portion for engagement by the appliance, an adjacent vertical portion abutting an end of a first slotted metal bar and a forked hook portion at the top of said vertical portion to hook over the adjacent part of a second slotted bar at the intersection of the second bar with the first bar.

4. A dolly as set forth in claim 2 which includes means to brace each corner of said frame to maintain the rectangular configuration of the frame, each of said brace means being a flat diagonally positioned metal bar with its opposite faces in vertical planes intersecting the two metal bars of the two sides of the frame adjacent the corner, said diagonal brace bar having downwardly open slots near its two ends in interlocking engagement respectively with complementary upwardly open slots in said two metal bars.

5. A dolly for use under a household appliance such as a stove or refrigerator, said dolly being in the form of four corner assemblies adjustably interconnected by overlapping portions thereof, each of said corner assemblies comprising: two mutually perpendicular intersecting flat bars in vertical planes interlocked by a slot in the lower edge of one bar and a slot in the upper edge of the other bar; support wheels mounted on fixed axes on opposite sides of the bar with the slot in its upper edge, the major portion of the vertical dimension of the wheels being coextensive with the major portion of the vertical dimension of the bars; and a flat diagonally positioned metal brace bar with its opposite faces in vertical planes and intersecting the two metal bars, said diagonal brace bar having downwardly open slots near its two ends in interlocking engagement respectively with complementary upwardly open slots in said two bars.

6. A dolly as set forth in claim 5 in which the overlapping portions of the four corner assemblies have overlapping longitudinal slots and are adjustably connected by releasable fastening means extending through the overlapping slots.

7. A dolly as set forth in claim 5 which has two pairs of support wheels straddling the bar that has the slot in its upper edge said diagonally positioned bar extends between the two pairs of wheels.

8. A dolly as set forth in claim 1, in which each pair of wheels straddling a bar is mounted on an axle extending through an aperture in the bar, the aperture being larger in cross section than the axle to permit the axle to tip slightly to lower one of the wheels and raise the other wheel to follow irregularities in the floor surface.

9. A dolly as set forth in claim 1 in which said wheels are mounted on axle pins extending through apertures in said bars.

10. A dolly for use under a household appliance such as a stove or refrigerator, said dolly being in the form of four corner assemblies adjustably interconnected by overlapping portions thereof, each of said corner assemblies comprising: two mutually perpendicular intersecting flat bars in vertical planes interlocked by a slot in the lower edge of one bar and a slot in the upper edge of the other bar; support wheels mounted on fixed axes on opposite sides of the bar with the slot in its upper edge, the major portion of the vertical dimension of the wheels being coextensive with the major portion of the vertical dimension of the bars; and a flat diagonally positioned metal brace bar with its opposite faces in vertical planes and intersecting the two metal bars, said diagonal brace bar having downwardly open slots near its two ends in interlocking engagement respectively with complementary upwardly open slots in said two bars, the two intersecting bars and the diagonal brace bar of each assembly being releasable from each other whereby the dolly may be sold in compact knocked-down state for assembly by the purchaser.

References Cited in the file of this patent

UNITED STATES PATENTS

| | | |
|---|---|---|
| 223,017 | Tucker | Dec. 30, 1879 |
| 739,097 | Marcy | Sept. 15, 1903 |
| 947,487 | Gold | Jan. 25, 1910 |
| 968,315 | Beckert | Aug. 23, 1910 |
| 1,145,532 | Webb | July 6, 1915 |
| 1,158,154 | Albree | Oct. 26, 1915 |
| 1,261,681 | Barnett | Apr. 2, 1918 |
| 1,300,533 | Wessinger | Apr. 15, 1919 |
| 1,363,138 | Markham | Dec. 21, 1920 |
| 1,548,391 | Steiner | Aug. 4, 1925 |
| 1,662,766 | Wait | Mar. 13, 1928 |
| 2,318,802 | Reid | May 11, 1943 |
| 2,408,852 | Holman | Oct. 8, 1946 |
| 2,656,040 | Pope | Oct. 20, 1953 |
| 2,683,610 | Brown | July 13, 1954 |
| 2,730,373 | Blevins | Jan. 10, 1956 |
| 2,768,834 | Wilson | Oct. 30, 1956 |

FOREIGN PATENTS

| | | |
|---|---|---|
| 698,319 | Great Britain | Oct. 14, 1953 |